United States Patent [19]
Wright et al.

[11] 3,871,690
[45] Mar. 18, 1975

[54] PIPE CLAMP

[75] Inventors: Peter C. Wright, Etobicoke; Donald L. Kirsch, Toronto, Ontario, both of Canada

[73] Assignee: Gidon Industries, Inc., Rexdale, Ontario,, Canada

[22] Filed: Dec. 12, 1972

[21] Appl. No.: 314,342

[30] Foreign Application Priority Data
Feb. 28, 1972  Great Britain ...................... 9161/72

[52] U.S. Cl. ................. 285/226, 285/417, 285/420, 403/50, 85/70
[51] Int. Cl. ............................................ F16l 21/00
[58] Field of Search ........... 285/420, 417, 340, 226; 85/70; 403/50, 51, 229, 297, 300, 223, 370, 372; 279/1 R, 1 D, 9 R; 24/115 R

[56] References Cited
UNITED STATES PATENTS
1,320,622  11/1919  Kennedy ................................. 85/70
2,450,170  9/1948  Smith .................................. 285/340
3,168,338  2/1965  Spieth .............................. 85/70 X
3,463,499  8/1969  Mott et al. ............................ 279/2

FOREIGN PATENTS OR APPLICATIONS
869,892  3/1953  Germany ........................... 403/372
15,358  1884  United Kingdom .................. 285/39

Primary Examiner—Dave W. Arola

[57]  ABSTRACT

A clamp for a shaft comprising; a band having a series of corrugations extending axially thereof providing alternating peaks and valleys, said valleys extending into the interior of said band to defind a bore into which said shaft is installed; said band being axially crushable to collapse the corrugations procuring narrowing of the bore to effect a tight grip on said shaft and to clamp it.

7 Claims, 12 Drawing Figures

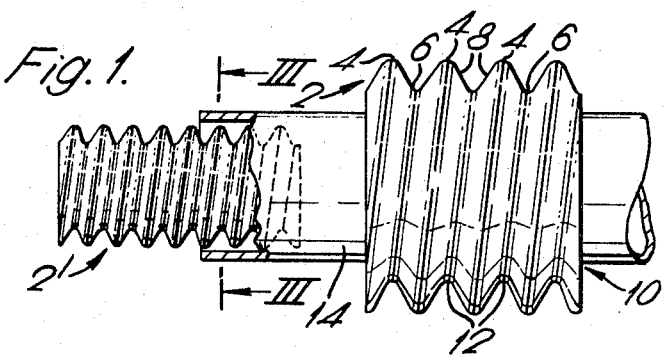
Fig. 1.
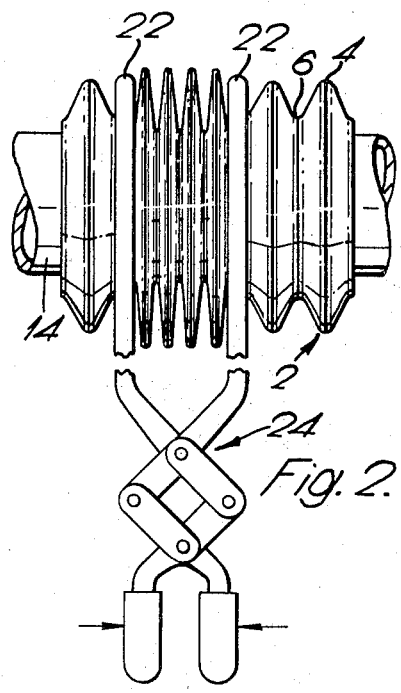
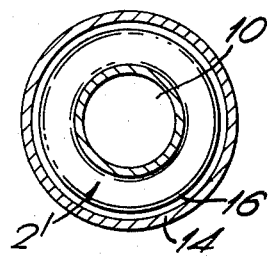
Fig. 3.
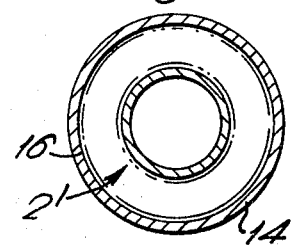
Fig. 4.
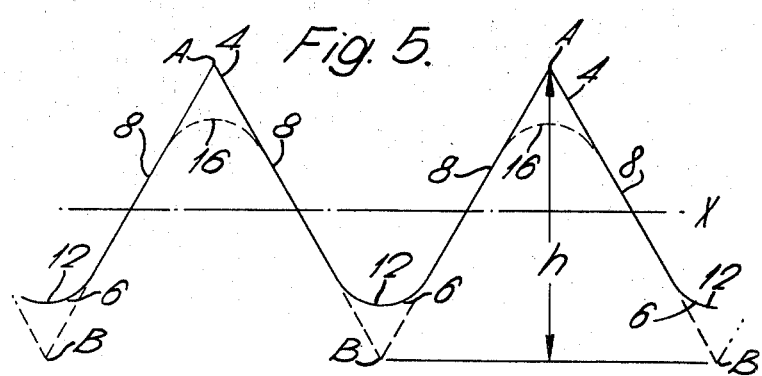
Fig. 5.

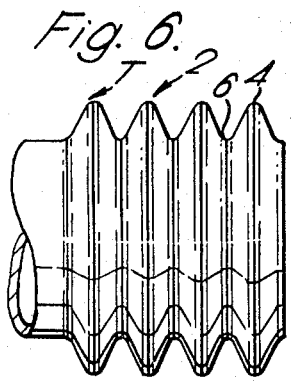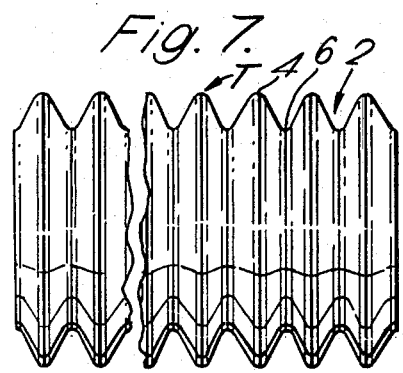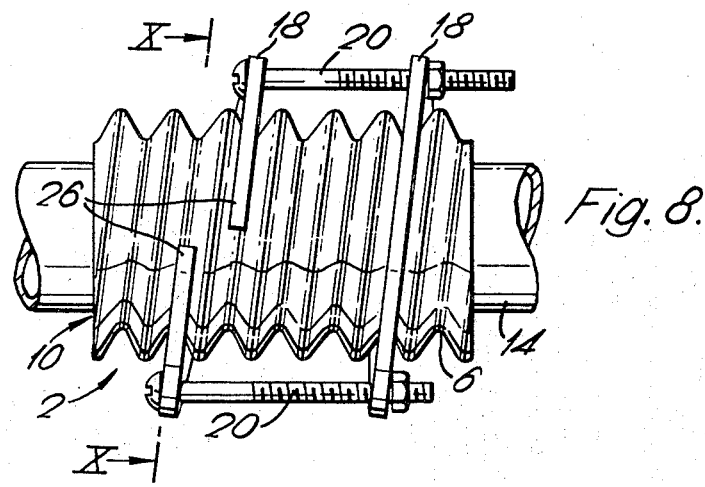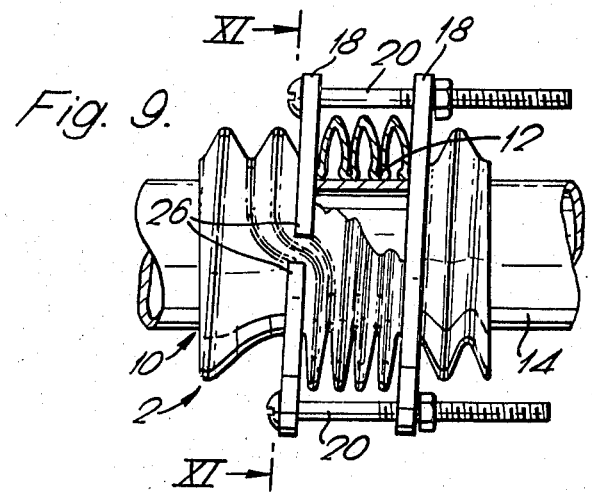

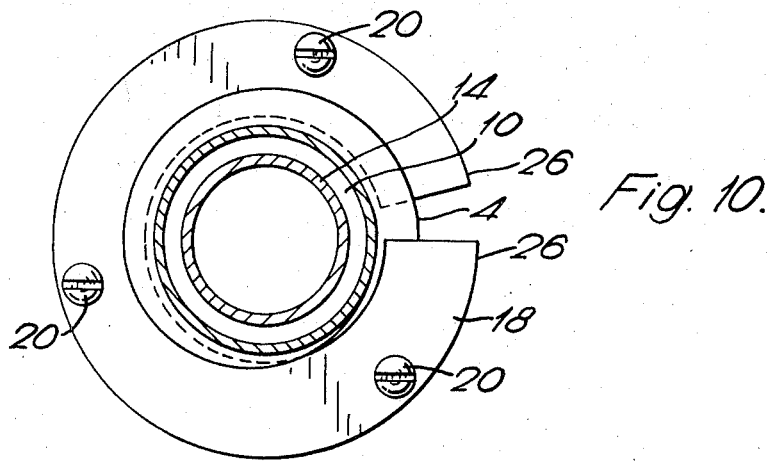
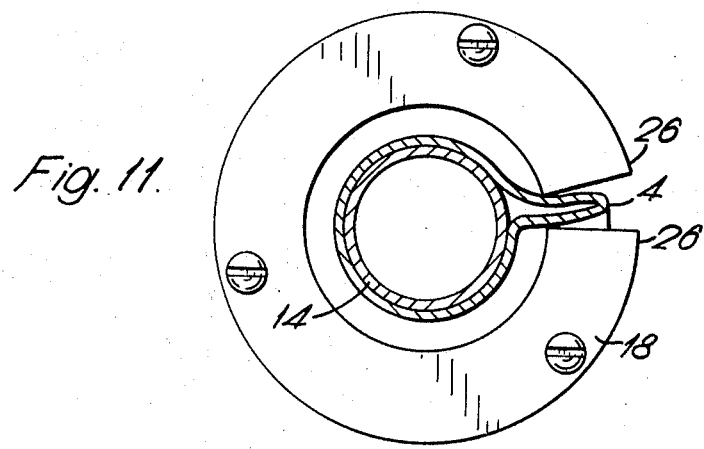
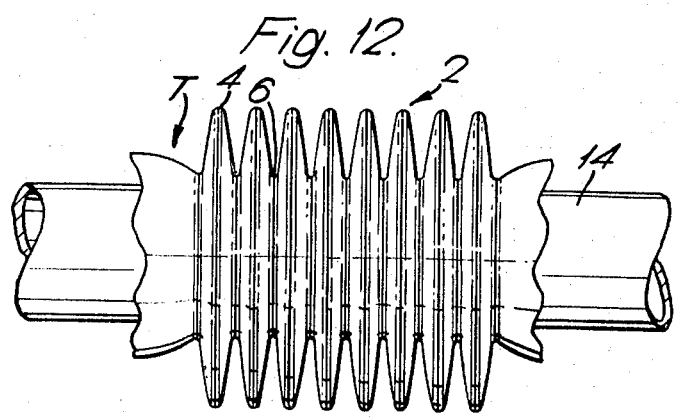

PIPE CLAMP

This invention refers broadly to a clamp and, in particular, to a clamp of the frictional grip type which is attachable to a shaft; the invention having further reference to tubing embodying the present clamp as well as to methods and apparatus for its installation.

In the prior art are many known frictional grip clamps. However, the clamp of the type under consideration has, in effect, many of the characteristics of a collapsible bellows and in its simplest form is constituted by a crushable band of malleable metal or its equivalent which is axially corrugated to create peaks and valleys and has a bore, for example, defined by said valleys within which a shaft is installable before the band is crushed. The shaft as contemplated herein may be an elongated element which is rigid and generally slender and which may or may not be tubular; its external configuration being optional which is to say, it may be round, elliptical or even polygonal under appropriate circumstances.

Upon installation of a shaft in the bore of the band in the example aforesaid, said band is thereafter axially crushed to collapse the corrugations procuring elongation thereof with concomitant narrowing of the bore and constriction of the band about the shaft contained therein to effect a tight frictional grip thereon and to clamp it. It will be understood that the bore of the instant clamp, which is defined by the valleys of the corrugations, will inherently diminish in response to axial crushing of the band since the valleys must necessarily elongate and grow inwardly toward the centre of the bore as a result of the decreasing angularity of the valleys as they move towards their collapsed position. The sample principle holds true with regard to the peaks of the corrugations. Only, in this case the peaks will elongate and grow outwardly away from the centre of the band as their angularity decreases in their movement towards collapsed position. As a result, it will be appreciated that the band may also be utilized within a hollow shaft so that with axial crushing of the band its peaks will extend outwardly, expanding the cross-sectional area of the band, and so bringing it into forcible engagement with the inner wall of the shaft to effect a tight frictional gripping and clamping relationship of the shaft and the band.

Because crushing the clamp varies its internal and external dimensions, there may well be many circumstances in which it does not require a precise mating fit with the shaft whereby a band of one average size may well be capable of accommodating and ultimately clamping shafts of various dimensions within a given range. Thus, since the precise fitting of the band and shaft is not critical, one size of band may serve as a clamp for shafts of various sizes.

It will be appreciated that the elongation of the corrugations with the accompanying expansion of the band and narrowing of its bore will depend to a degree on the angularity, depth and other related properties of the corrugations as well as on the degree of crushing or collapse of the corrugations.

In addition thereto, the elongation of the corrugations will also be influenced by the restraint placed thereon by the shaft so that if the band and the shaft have an initial slack fit more crushing of the band with consequent elongation of its corrugations will be needed in order to effect clamping whereas if the band and shaft have a close initial fit, clamping may be achieved with very little crushing of the band and the terminal points of its corrugations may well in that case, tend to spread along the shaft thereby increasing the area or extent of frictional contact.

An important object of this invention is to provide a clamp comprised of a deformable band which is initially freely telescopable with a shaft and is thereafter deformable to exert a tight frictional grip on the shaft and to maintain such grip when and if the deforming force is removed.

Another object of the present invention is to provide a clamp comprised of a deformable band as aforesaid which is telescopable with shafts of various sizes within a given range and has axial corrugations which are collapsible to effect clamping of said shafts in the telescopic relations aforesaid.

The various objects of the invention are attained by providing a band which is telescopically engageable with a shaft and has a series of corrugations extending axially thereof providing one group of formations constituting peaks on the surface of the band and a second group of formations constituting valleys extending into the interior of the band; the peaks and valleys alternating with each other and the formations of the groups being angularly acute as hereinafter defined and equal to each other; said band and shaft being initially freely movable one within the other and said band being axially crushable to collapse the said corrugations and so to elongate the said peaks and valleys, expanding the cross-sectional area of the band and constricting its bore procuring a tight frictional intergrip of the band and the shaft.

The invention also visualizes a band as above described forming an integral part of a tube; for example, the exhaust pipe of a motor vehicle.

The invention further visualizes a band as above described which is crushable by compression elements disposable in mutually confronting relation with at least two corrugations sandwiched therebetween; means being associated with said compression elements for effecting movement of one of them, at least, toward the other to crush and collapse the sandwiched corrugations and to extend them radially of the band thereby procuring a frictional intergrip between the band and a telescopically associated shaft.

Still further, the invention herein contemplates the method of clamping together two elements telescopically disposed in inner and outer relation; one said element being deformable under pressure to effect a tight frictional intergrip with the other.

The method includes, essentially, the steps of: fitting said deformable element with a crushable band having corrugations extending axially thereof providing one group of formations constituting peaks on the surface of said band and a second group of formations constituting valleys extending into the interior of said band, the peaks and valleys alternating with each other and the formations of said groups being angularly acute and equal; said band being crushed axially to effect radial elongation or extension of said peaks and valleys to bear upon said deformable element and to press it into tight frictional engagement with the other element.

Other objects of the invention more or less broad than the foregoing, will become apparent from the hereinafter following description of the elements, parts and principles of the invention given herein solely by way of example and with reference to the accompanying drawings wherein like reference numerals refer to like parts and wherein:

FIG. 1 is an elevational view of a spirally corrugated band having a hollow shaft contained within its bore; the hollow shaft in turn containing a similar band, though smaller in size, within its bore; parts being broken away from the shaft end showing the band centered therein;

FIG. 2 is an elevational view of a band with corrugations discontinuous relative to each other; said band having four of its corrugations axially crushed between the compression elements of a forceps tool into frictional interengagement with a shaft contained within the bore of the band;

FIG. 3 is a cross-sectional end view taken along line III—III of FIG. 1 showing the band centered within the bore of the shaft;

FIG. 4 is a cross-sectional view of a shaft as in FIG. 3 with a band therein axially crushed into frictional interengagement with the interior wall of the shaft;

FIG. 5 is a diagrammatic cross-sectional view of the corrugations according to the present invention showing their various components;

FIG. 6 is an elevational view of a corrugated band according to the present invention integral with the end of a tube;

FIG. 7 is an elevational view of a tube corrugated throughout its length correspondingly to the band;

FIG. 8 is an elevational view of a spirally corrugated band with a shaft contained in its bore and interconnected, spaced and mutually confronting compression elements positioned in valleys of the corrugations;

FIG. 9 is an elevational view of the structure shown in FIG. 8 with the compression elements having been drawn together to collapse the corrugations sandwiched therebetween; parts of the collapsed corrugations and shaft being broken away to expose the frictional intergrip between the valleys of the corrugations and the exterior surface of the shaft;

FIG. 10 is a cross-sectional end view of the structure of FIG. 8 taken along line X—X showing the shaft centered in the bore of the band;

FIG. 11 is a cross-sectional end view taken along line XI—XI of FIG. 9 showing the valleys of the corrugations in abutment with the exterior surface of the shaft and the kink formed in the corrugation positioned between the ends of the split collar, and FIG. 12 is an elevational view of a band positioned intermediate the ends of a tube and axially crushed into frictional intergrip with the exterior surface of a shaft contained within its bore.

In FIG. 1 is illustrated a clamp according to the present invention. Essentially, said clamp comprises a band 2 formed of an inelastic substance such as metal, for example, which is capable of being bent or otherwise deformed under moderately strong forces and, once bent, of retaining its set.

It should further be observed at this juncture that although band 2 is illustrated in the drawing as being of circular conformation, such illustration is for expediency only and should not be regarded as a limitation since absolute circularity is far from essential to this invention.

Said band 2 is provided with a series of corrugations creating peaks and valleys to be described which respectively surround it. That is to say, while the series of corrugations extends axially of the band — i.e. between its ends — each corrugation surrounds the band 2 in radial fashion.

With further reference to the corrugations of the band 2 it will be observed from FIG. 1 that in extending axially thereof they provide groups of formations; one of which constitutes peaks 4 which extend radially above said band 2 and the second of which constitutes valleys 6 which extend inwardly into the interior of said band 2; said peaks 4 and valleys 6 alternating with each other in either one of two arrangements. That is to say, each of said groups of formations may be constituted by a continuous spiral in the manner of a screw thread or as shown in FIG. 2 may be discontinuous relative to each other in the manner of independent rings. At all events, irrespective of the particular arrangement aforesaid, the respective formations of said groups are angularly acute and equal.

In the present instance, the "angularity" of the formations has reference to the included angle defined between the walls 8—8 either of the respective peaks 4 or of the valleys 6; said walls being presumed to be rectilinear within the context hereof. The term "angularly acute" is meant to embrace conditions in which the aforesaid walls 8—8 of the respective peaks 4 and valleys 6 are either parallel to each other or convergent towards the vertices of the peaks or valleys as the case may be with the included angle defined therebetween being 90° or less.

The invention does not rule out the possibility that its purposes may be served by corrugations having peaks and valleys exceeding 90° in angularity. However, for various reasons, it is believed that peaks and valleys which are angularly obtuse would be erratic in their response to axial crushing. That is to say, it has been found that angularly obtuse formations when collapsed under axial crushing of the band do not necessarily, in all cases, collapse uniformly in the required fashion; displaying, at times, a tendency to buckle rather than elongate.

On the other hand, crushing tests performed on axially corrugated bands with angularly acute formations as aforesaid have proven to be reasonably uniformly successful. Otherwise stated, it has been found in most tests that when crushed, as herein visualized, angularly acute corrugations have elongated radially of the band in a uniform fashion procuring outward and inward extension of the peaks and the valleys, respectively.

FIG. 5 shows diagrammatically the characteristics of the corrugations under present conditions. In FIG. 5 the several peak vertices are defined by the reference letters A and the several vertices of the valleys 6 are defined by the reference letters B. Thus the angle included between walls 8—8 of a peak 4 is defined by the symbol BAB whereas the angle included between walls 8—8 of a valley 6 is defined by symbol ABA.

In the basic formation of FIG. 5 the peaks 4 and valleys 6 extend uniformly above and below hypothetical phase line X. However, it is possible, feasible and may be quite desirable for a variety of reasons to truncate the peaks 4 or valleys 6 or both of them; an example of the effect of truncation of peaks 4 being shown in FIG. 5 by dotted lines above phase line X.

As reviewed in FIG. 1 said band 2 includes in addition to said corrugations a bore 10 delimited by the beds 12 of said valleys 6. Throughout its length said bore 10 is effectively of constant dimension which corresponds, of course, to the cross-sectional dimension of a shaft 14 receivable therein. Initially, said shaft 14 is withdrawably installable in said band 2 which is axially crushable thereafter to collapse the corrugations aforesaid as hereinafter described in greater detail and so to effect a frictional intergrip with shaft 14.

The area of the frictional interengagement between the valleys 6 and an associated shaft 14 installed in bore 10 maybe enhanced by truncating the valleys 6 as in FIG. 5, providing, as a result relatively broad lands constituted by valley beds 12 which are capable of having substantial engagement with said shaft 14.

Alternately, a similar band 2 of smaller dimensions in this embodiment, may be installed in a hollow portion of shaft 14 of FIGS. 1 and 3 and axially crushed therein to effect a corresponding intergrip with its interior wall as best shown in FIG. 4. In that case truncating peaks 4 may be advantageous since again relatively broad lands are provided by the crests 16 of the peaks 4 which increase the area of frictional contact between the crushed band and the interior wall of hollow shaft 14.

Inasmuch as said clamp is constituted by a corrugated band 2 and is of tubular configuration it will be understood that it lends itself to various areas of utility. For example, as illustrated in FIG. 6, said band 2 may form an integral part of tube T and preferably, in this embodiment, is located on one end thereof, although, of course, it may have an intermediate location on tube T. Said tube T may also be corrugated throughout more or less of its length correspondingly to said band 2 as shown in FIG. 7; the tube T, in turn, being capable of serving any of a wide variety of different uses such as, for example, an exhaust pipe for a motor vehicle.

With particular reference now to the manner in which said band 2 with shaft 14 installed therein is crushed to collapse the corrugations aforesaid, it will be seen from viewing FIG. 8, that the invention visualizes compression elements 18—18 seated in spaced valleys 6—6 and in mutually confronting relation with at least two corrugations sandwiched between them; means being provided for effecting advancement of at least one of said compression elements 18 toward the other. Said compression elements 18—18 may be bolted together, particularly if they encircle the band 2 substantially completely as in FIGS. 10 and 11; advancement thereof being then achieved by tightening the bolts 20.

Alternately, said compression elements 18—18 may constitute the terminals 22 of a forceps or tongs 24 as shown in FIG. 2.

At all events, irrespective of the particular device utilized for effecting movement thereof, the compression elements 18—18 crush and collapse the sandwiched corrugations as they come together narrowing the bore 10 of band 2 to effect a tight intergrip between band 2 and shaft 14 as in FIGS. 2 and 9.

In order to more clearly understand this operation attention is directed to FIG. 5 and a peak angle BAB. Essentially, angle BAB simulates a triangle having walls 8—8 of constant dimension, hypothetical base BB and vertical height h. It will be understood that as walls 8-8 advance towards each other as a result of collapsing of the corrugations, base BB decreases in length with consequent increasing of height h in which event vertex A extends outwardly from phase line X and vertices BB extend inwardly therefrom towards the center of the bore until valleys 6 engage shaft 14.

As may be appreciated if the band crushing force continues after the valley beds 12 enter into the tight frictional interengagement with a contained shaft 14 as aforesaid, there will be a tendency for beds 12 to spread or mushroom out along the shaft 14 as in FIG. 9 thereby increasing the extent of frictional contact which in turn procures a superior intergrip between the shaft 14 and the band 2. The converse situation occurs when the band 2 is compressed inside hollow shaft 14 which is brought about by peaks 4 being radially elongated or extended into interengagement with the wall of shaft 14. In this case, axial crushing of the corrugations of band 2 may be accomplished with any of a variety of devices.

The compression elements 18—18 aforesaid may, of course, vary widely in their nature and construction as well as in the mode of their engagement with the corrugations and, in fact, they need not be similar to each other except in function. In the simplest form visualized by this embodiment, however, said compression elements 18—18 are constituted by collars in abutment with peaks 4.

Under certain conditions, it may become desirable to kink one or more corrugations — for example, to block passage through the peaks 4 or valleys 6 particularly when spirally formed, and to achieve this end, the invention herein contemplates a compression element 18 constituted by a collar which is split as in FIGS. 8–11. Said split collar 18 includes end 26—26 which are offset to render said collar 18 capable of being threaded onto the spiral corrugations of said band 2 in which event said offset ends 26—26 will straddle a peak 4 between them; said collar 18 also being deformable under the band crushing forces so that its ends 26—26 tend to align themselves with each other as best shown in FIG. 9, while at the same time effecting a kink in the peak initially positioned therebetween.

With reference now to FIG. 12 it will be observed that band 2 is located on said tube T at a position intermediate its ends. Specifically, the band 2 depicts the manner in which it is able to hold its set as aforesaid on shaft 14 once the corrugations have been collapsed and with the compression elements removed.

By way of summary, therefore, the invention herein visualizes the clamping together of two elements disposed in telescopic inner and outer relation; one said element being deformable under pressure to effect a tight frictional intergrip with the other. Said deformable element comprising a crushable band having corrugations extending axially thereof providing one group of formations constituting peaks on the surface of said band and a second group of formations constituting valleys extending into the interior of said band; the peaks and valleys alternating with each other and the formations of said groups being angularly acute and equal. Said band is crushed axially to effect elongation of said peaks and valleys radially of the band with consequent deformation of said deformable element to effect a tight frictional intergrip with the other element.

In use said deformable element may constitute the outer element wherein said band is crushed against the inner element to effect the tight frictional grip aforesaid by elongation of the valleys as shown in FIG. 9, or said deformable element may constitute the inner element wherein said band is crushed against the outer element to effect the tight frictional grip aforesaid by elongation of the peaks as shown in FIG. 4.

What we claim is:

1. Apparatus for clamping a shaft comprising:
a band having a mating fit with said shaft;
corrugations extending axially thereof providing one group of formations constituting peaks on the surface of said band and a second group of formations constituting valleys extending into the interior of said band, the peaks and valleys alternating with each other and the formations of said groups being angularly acute and equal;
a bore defined within said band by said valleys within which said shaft is receivable, said band being axially crushable to collapse the corrugations narrowing the said bore;
compression elements at least one of which is seated in a valley; disposed in confronting relation with at least two said corrugations sandwiched therebetween, and
means for effecting movement of at least one of said compression elements, toward the other to crush and collapse the sandwiched corrugations narrowing the bore of the band to effect a tight grip on said shaft and to clamp it.

2. Apparatus for clamping a shaft as defined in claim 1 wherein:
said compression elements comprise washers seated in the valleys of the corrugations.

3. Apparatus for clamping a shaft as defined in claim 1 wherein:
said moving means comprises screw threaded devices linking said compression elements, said devices being operable to draw together the said compression elements.

4. Apparatus for clamping a shaft as defined in claim 1 wherein:
said moving means comprises a forceps engageable with the respective said compression elements.

5. Apparatus for clamping a shaft as defined in claim 1 wherein:
each of said groups of formations is comprised of a continuous spiral, and
one of said compression elements is comprised of a split washer having offset ends rendering said washer capable of being threaded onto said band.

6. Apparatus for clamping a shaft as defined in claim 1 wherein:
said compression element comprises a washer.

7. Apparatus for clamping a shaft as defined in claim 5 wherein:
said offset washer ends accommodate a said peak between them, and
said washer is deformable to substantially re-align said ends to kink the said peak.

* * * * *